United States Patent
Johnson et al.

(10) Patent No.: US 9,061,770 B2
(45) Date of Patent: Jun. 23, 2015

(54) ELECTRONIC FLIGHT BAG SYSTEMS AND METHODS FOR VERIFYING CORRECT TAKEOFF PERFORMANCE DATA ENTRY

(71) Applicant: Honeywell Internationall Inc., Morristown, NJ (US)

(72) Inventors: Steve Johnson, North Bend, WA (US); Yasuo Ishihara, Kirkland, WA (US); Kevin J. Conner, Kent, WA (US); Robert A. Champion, Mukilteo, WA (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 1 day.

(21) Appl. No.: 13/751,831

(22) Filed: Jan. 28, 2013

(65) Prior Publication Data

US 2014/0214246 A1    Jul. 31, 2014

(51) Int. Cl.
   *B64D 45/00* (2006.01)
   *G08G 5/00* (2006.01)
(52) U.S. Cl.
   CPC ........ *B64D 45/00* (2013.01); *B64D 2045/0075* (2013.01); *G08G 5/0065* (2013.01)
(58) Field of Classification Search
   CPC .................. B64D 45/00; B64D 2045/0075
   USPC ................................. 701/3, 14, 15
   See application file for complete search history.

(56) References Cited

U.S. PATENT DOCUMENTS

| | | | |
|---|---|---|---|
| 7,149,612 B2 * | 12/2006 | Stefani et al. | 701/33.4 |
| 7,529,603 B2 | 5/2009 | Allen et al. | |
| 7,751,951 B2 | 7/2010 | Pitard et al. | |
| 7,769,501 B2 * | 8/2010 | Lusardi et al. | 701/3 |
| 7,885,734 B2 | 2/2011 | Lemoult et al. | |
| 7,899,585 B2 * | 3/2011 | Rouquette et al. | 701/9 |
| 2010/0030408 A1 | 2/2010 | Khatwa et al. | |
| 2010/0094488 A1 | 4/2010 | Michal et al. | |

(Continued)

FOREIGN PATENT DOCUMENTS

GB    2189448 A    10/1987

OTHER PUBLICATIONS

EP Examination Report for Application No. 14150999.2, dated Jul. 11, 2014.

(Continued)

*Primary Examiner* — Helal A Algahaim
*Assistant Examiner* — Donald J Wallace
(74) *Attorney, Agent, or Firm* — Ingrassia Fisher & Lorenz, P.C.

(57) ABSTRACT

Systems and methods for verifying that the flight crew has not made an error in entering takeoff flight performance data into the flight management system (FMS) using the electronic flight bag (EFB). The EFB includes a user interface that receives basic flight plan information and a processor. The processor automatically receives calculated takeoff performance data based on a previously entered basic flight plan, automatically receives user-entered takeoff performance data from a flight management system (FMS) located on a host aircraft, automatically compares the calculated takeoff performance data to the received takeoff performance data, and generates an entry error indication, if the comparison indicates that at least a portion of the entered takeoff performance data does not match the calculated takeoff performance data. An output device outputs the generated entry error indication.

15 Claims, 3 Drawing Sheets

(56) References Cited

U.S. PATENT DOCUMENTS

2010/0152924 A1* 6/2010 Pandit et al. .................. 701/3
2013/0124018 A1* 5/2013 Lentz .............................. 701/3

OTHER PUBLICATIONS

EP Search Report for Application No. 14150999.2, dated Jun. 30, 2014.

* cited by examiner

ELECTRONIC FLIGHT BAG SYSTEMS AND METHODS FOR VERIFYING CORRECT TAKEOFF PERFORMANCE DATA ENTRY

BACKGROUND OF THE INVENTION

Takeoff performance, as currently practiced in the air transport industry involves a series of steps, many of which involve manual crew input. In addition, the primary means of catching errors in this process typically relies on manual cross-checks between the crew.

Many airlines are now using electronic flight bags and/or laptop computers to replace the paper performance data that has been traditionally used. These devices typically host an original equipment manufacturer (OEM)-approved performance calculation tool that will provide the pilot with the predicted takeoff performance data. These tools typically require the manual entry of relevant aircraft and atmospheric data before the calculation can be made. The output of these calculations then has to be manually transferred by the pilots into the flight management system (FMS). This includes V-speeds, weight, and thrust setting. However, human error can occur in this process.

SUMMARY OF THE INVENTION

The present invention provides systems and methods for verifying that the flight crew has not made an error in entering takeoff flight performance data into the flight management system (FMS) using the electronic flight bag (EFB). The EFB includes a user interface that receives basic flight plan information and a processor. The EFB includes an On-board Performance Tool (OPT) that calculates takeoff performance data based on a previously entered basic flight plan and pilot entry. The processor automatically receives user-entered takeoff performance data from a flight management system (FMS) located on a host aircraft, automatically compares the OPT calculated takeoff performance data to the received takeoff performance data, and generates an entry error indication, if the comparison indicates that at least a portion of the entered takeoff performance data does not match the calculated takeoff performance data. An output device outputs the generated entry error indication.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
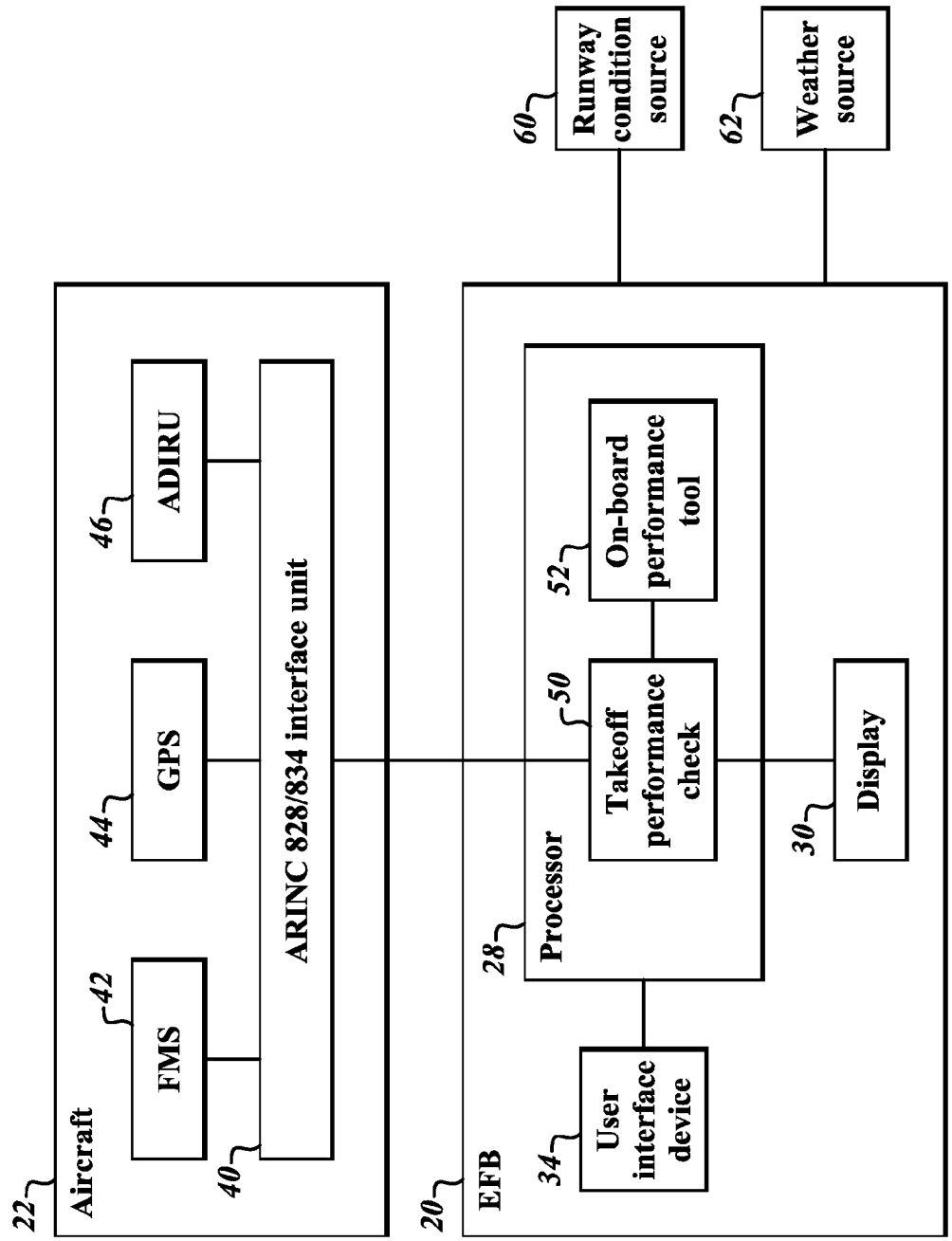
FIG. 1 is a block diagram of an exemplary system formed in accordance with an embodiment of the present invention.

FIG. 1 shows an aircraft 22, and an exemplary electronic flight bag (EFB) 20 that is equipped to verify that data entered by the flight crew into a flight management system (FMS) 42 are accurate. The EFB 20 includes a processor 28 that is in data communication with a user interface device 34 and a display 30 (e.g., airport moving map). The aircraft 22 includes the FMS 42, a positioning device (e.g., global positioning system (GPS)) 44 and an air data inertial reference unit (ADIRU) 46. The components of the aircraft 22 communicate with the EFB 20 using an aircraft interface unit 40 (e.g., Aeronautical Radio, Inc. (ARINC) 828/834).

The processor 28 executes a takeoff performance check application 50. The takeoff performance check application 50 receives input from an on-board performance tool application 52 also executed by the processor 28. The takeoff performance check application 50 also receives takeoff performance data entered by the flight crew into the FMS 42. The takeoff performance check application 50 checks that the takeoff performance data entered into the FMS 42 match the takeoff performance data output from the on-board performance tool application 52. An error message is generated, if there exists a mismatch. The generated error message is presented on the display 30. The presented error message includes text and/or special color, highlighting, and/or flashing of an associated icon/light.

The takeoff performance data that may be checked include:
V-speeds;
Flap setting;
Takeoff Thrust;
Weight; and
Center of Gravity (CG).

Figure 2:
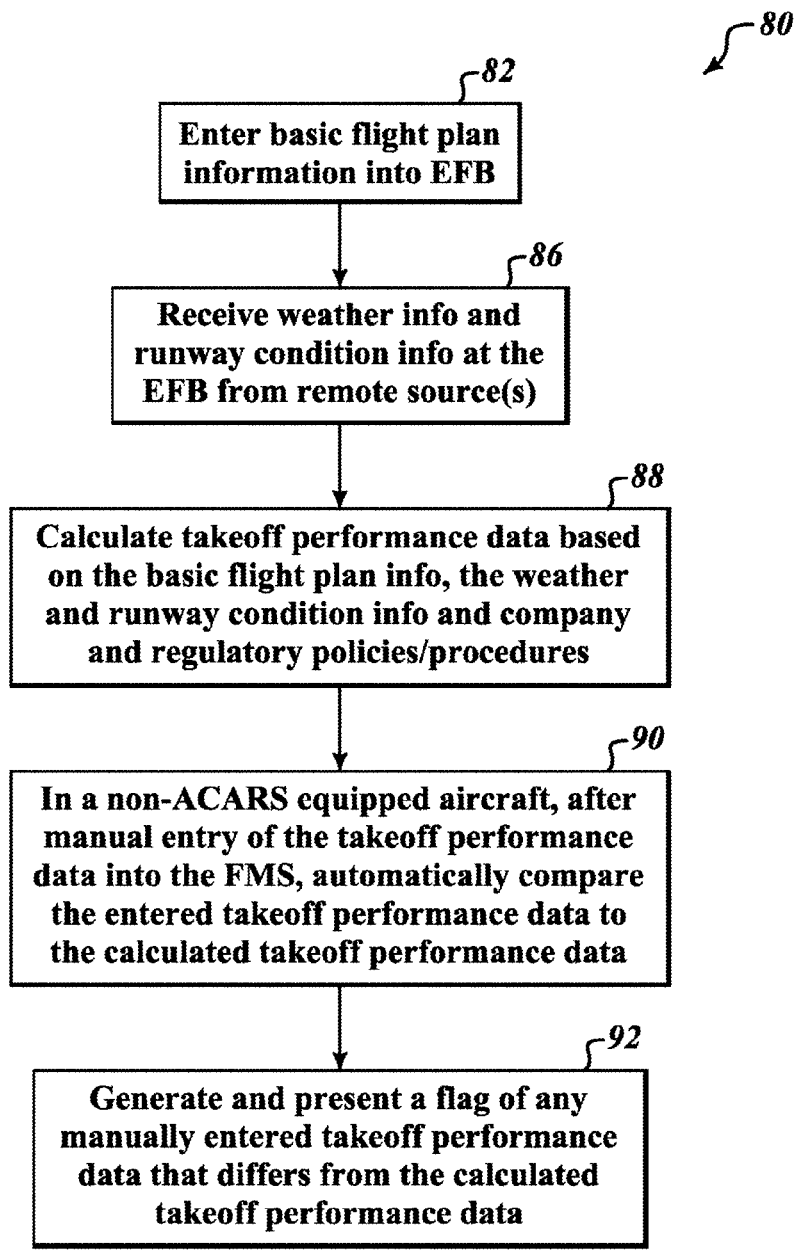
FIG. 2 is a flow diagram of an exemplary process performed by and with the systems shown in FIG. 1.

FIG. 2 shows an exemplary process 80 performed by the systems shown in FIG. 1. First at a block 82, basic flight plan information is entered into the EFB 20 via the user interface device 34. The entered basic flight plan information includes Zero Fuel Weight, Fuel Weight, CG, Takeoff Flaps Setting, Available Runway Length, Runway Surface Condition, Runway Elevation, Air Temperature, Wind Velocity/Direction, etc. At a block 86, weather information and runway condition information are received at the processor 28 from the corresponding sources. Next, at a block 88, takeoff performance data are calculated by the on-board performance tool application 52, based on the entered basic flight plan information, the weather and runway condition information, and previously stored (or dynamically received from an external source) company and regulatory policies/procedures. Then, at a block 90, after manual entry of the takeoff performance data into the FMS 42, the takeoff performance check application 50 automatically compares the manually entered takeoff performance data to the calculated takeoff performance data.

At a block 92, the processor 28 generates a flag for any manually entered takeoff performance data that differs from the calculated takeoff performance data. An indicator associated with the flag is presented to the pilot on the display 30 or on a comparable device.

Figure 3:
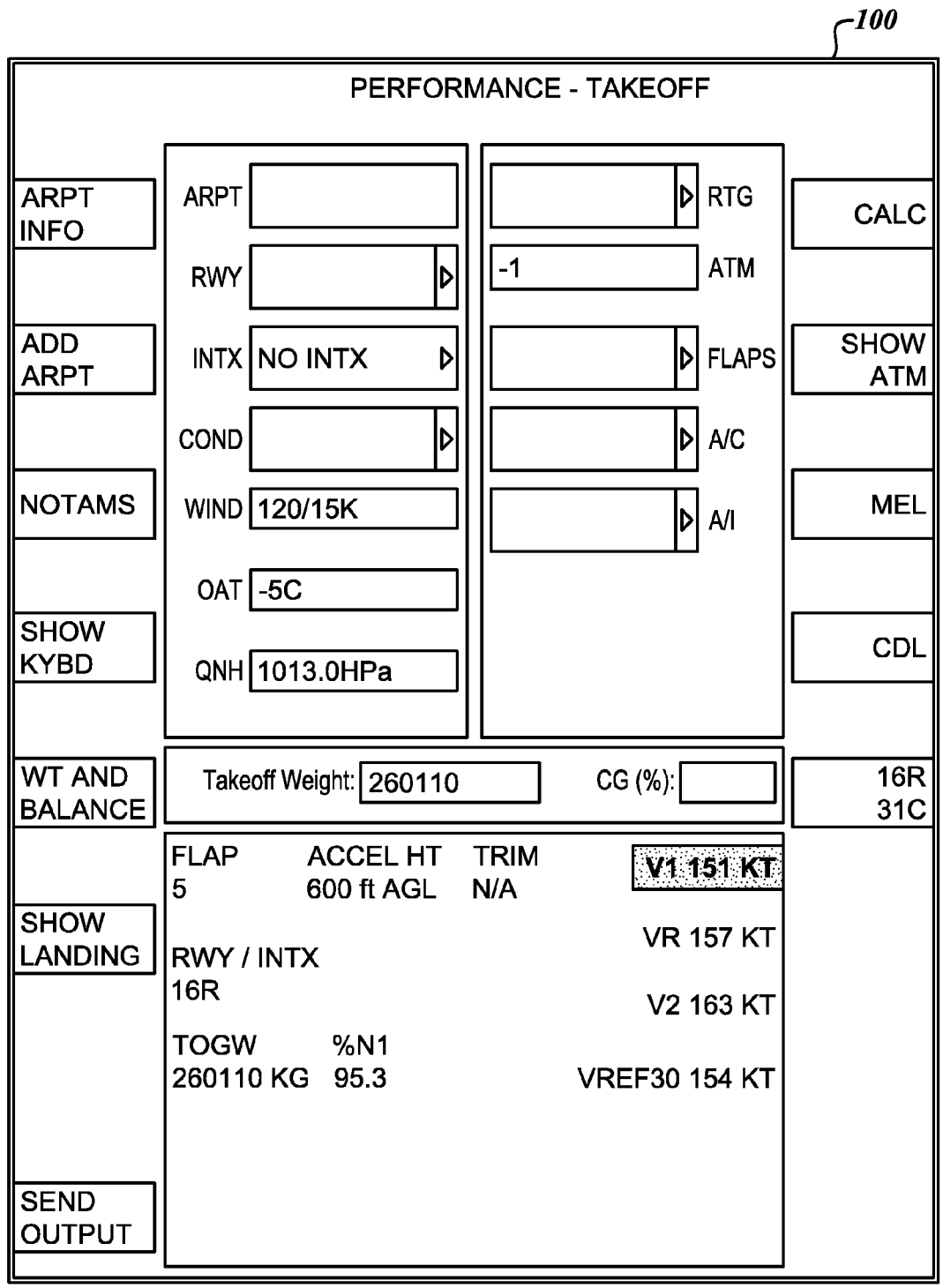
FIG. 3 is an exemplary screen shot of an image presented on an electronic flight bag display after the process of FIG. 2 has been completed.

FIG. 3 shows an exemplary screen shot of an image 100 produced by the processor 28 after execution of the takeoff performance-check application 50 and the on-board performance-tool application 52. In this example, the processor 28 has determined that the data generated by the on-board performance-tool application 52 do not match the comparable data entered by the flight crew into the FMS 42.

The data in the OPT image 100 that is the auto check includes: V1; VR; V2; flap setting; weight; CG; and takeoff thrust setting (% N1). The V1 speed shown here has been identified as having a comparison error with the pilot-entered FMS data.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
   at a processor within an electronic flight bag (EFB),
      automatically receiving calculated takeoff performance data from an On-board Performance Tool based on previously entered basic flight plan information;
      automatically receiving user-entered takeoff performance data from a flight management system (FMS) located on a host aircraft, the user-entered takeoff performance data manually entered into the FMS by a flight crew member;
      automatically comparing the calculated takeoff performance data to the user-entered takeoff performance data; and
      generating an entry error indication, if the comparison indicates that at least a portion of the user-entered takeoff performance data does not match the calculated takeoff performance data; and
   at an output device associated with the EFB,
      outputting the generated entry error indication.

2. The method of claim 1, further comprising:
   at the processor, generating an on-board performance-tool image comprising the calculated takeoff performance data; and
   at the output device, outputting the generated on-board performance-tool image;
   wherein the outputted on-board performance-tool image includes the outputted entry error indication.

3. The method of claim 1, wherein outputting the generated entry error indication comprises causing an error message to be presented on a display of the EFB.

4. The method of claim 1, wherein the calculated takeoff performance data and the user-entered performance takeoff data comprises one or more of the group consisting of V-speeds, flap setting, takeoff thrust, weight, and center of gravity.

5. The method of claim 1, wherein the On-board Performance Tool calculates the calculated takeoff performance data based upon weather and runway condition information in addition to the previously entered basic flight plan information.

6. An electronic flight bag (EFB) apparatus comprising:
   a processor configured to,
      automatically receive calculated takeoff performance data from an On-board Performance Tool based on a previously entered basic flight plan;
      automatically receive user-entered takeoff performance data from a flight management system (FMS) located on a host aircraft, the user-entered takeoff performance data manually entered into the FMS by a flight crew member;
      automatically compare the calculated takeoff performance data to the user-entered takeoff performance data; and
      generate an entry error indication, if the comparison indicates that at least a portion of the user-entered takeoff performance data does not match the calculated takeoff performance data; and
   an output device configured to output the generated entry error indication.

7. The apparatus of claim 6, wherein the processor is further configured to generate an on-board performance-tool image comprising the calculated takeoff performance data, wherein the output device is further configured to output the generated on-board performance-tool image, wherein the outputted on-board performance-tool image includes the outputted entry error indication.

8. The apparatus of claim 6, wherein, in outputting the generated entry error indication, the output device is configured to cause an error message to be presented on a display of the EFB.

9. The apparatus of claim 6, wherein the calculated takeoff performance data and the user-entered performance takeoff data comprises one or more of the group consisting of V-speeds, flap setting, takeoff thrust, weight, and center of gravity.

10. The apparatus of claim 6, wherein the On-board Performance Tool calculates the calculated takeoff performance data based upon weather and runway condition information in addition to the previously entered basic flight plan information.

11. A system comprising:
    a means for automatically receiving calculated takeoff performance data, based on previously entered basic flight plan information;
    a means for automatically receiving user-entered takeoff performance data from a flight management system (FMS) located on a host aircraft, the user-entered takeoff performance data manually entered into the FMS by a flight crew member;
    a means for automatically comparing the calculated takeoff performance data to the user-entered takeoff performance data;
    a means for generating an entry error indication, if the comparison indicates that at least a portion of the user-entered takeoff performance data does not match the calculated takeoff performance data; and
    a means for outputting the generated entry error indication.

12. The system of claim 11, further comprising:
    a means for generating an on-board performance-tool image comprising the calculated takeoff performance data, wherein the means for outputting the generated entry error indication is further configured to output the entry error indication with the generated on-board performance-tool image.

13. The system of claim 11, wherein the means for outputting the generated entry error indication comprises a means for causing an error message to be presented on a display of the EFB.

14. The system of claim 11, wherein the calculated takeoff performance data and the user-entered performance takeoff data comprises one or more of the group consisting of V-speeds, flap setting, takeoff thrust, weight, and center of gravity.

15. The system of claim 11, wherein the calculated takeoff performance data is calculated based upon weather and runway condition information in addition to the previously entered basic flight plan information.

* * * * *